Jan. 2, 1951      B. S. HARRINGTON      2,536,054
APPARATUS FOR MANUFACTURING CHEESE AND THE LIKE
Filed Dec. 10, 1947      4 Sheets-Sheet 1
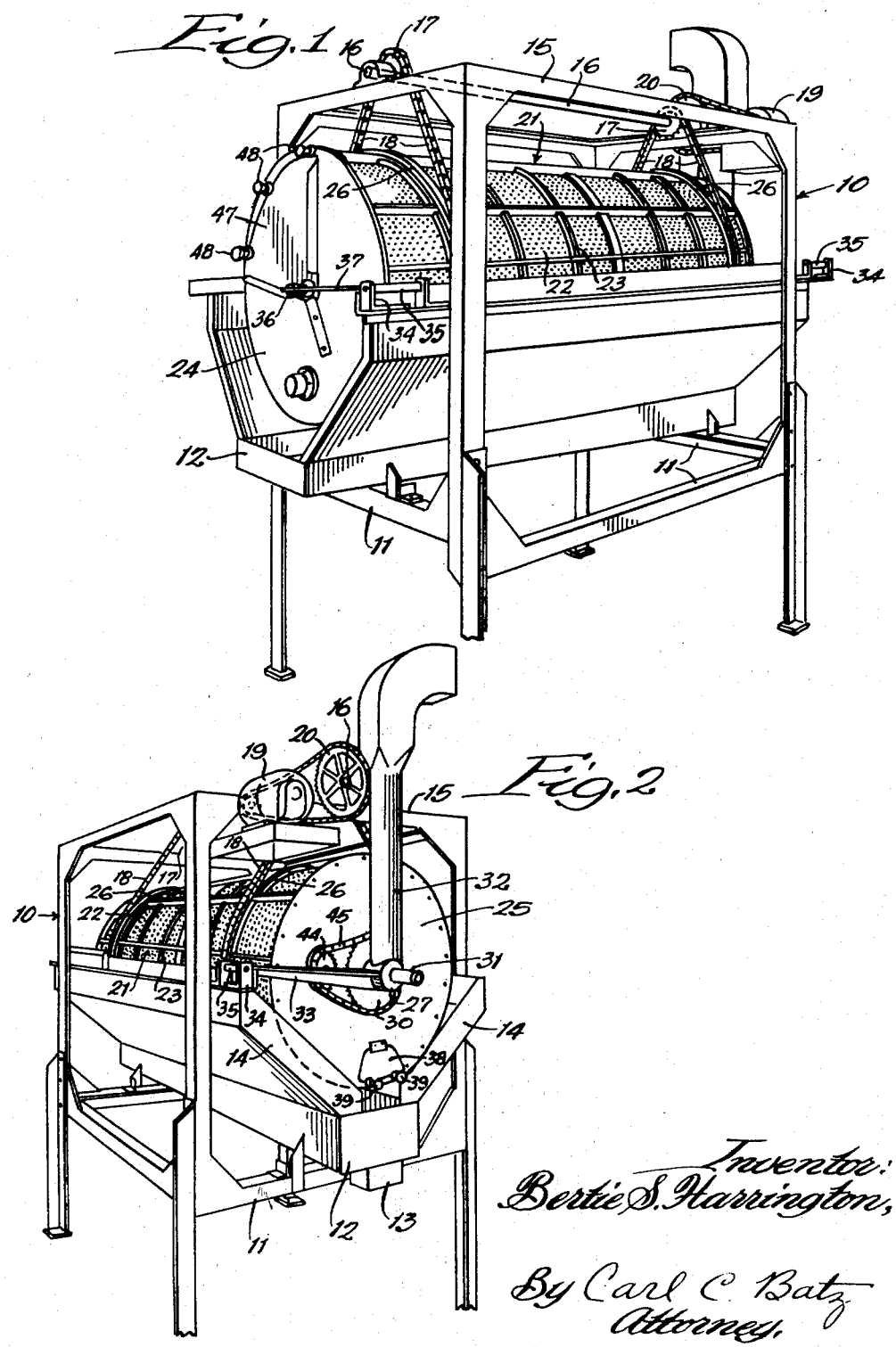

Jan. 2, 1951 B. S. HARRINGTON 2,536,054
APPARATUS FOR MANUFACTURING CHEESE AND THE LIKE
Filed Dec. 10, 1947 4 Sheets-Sheet 2
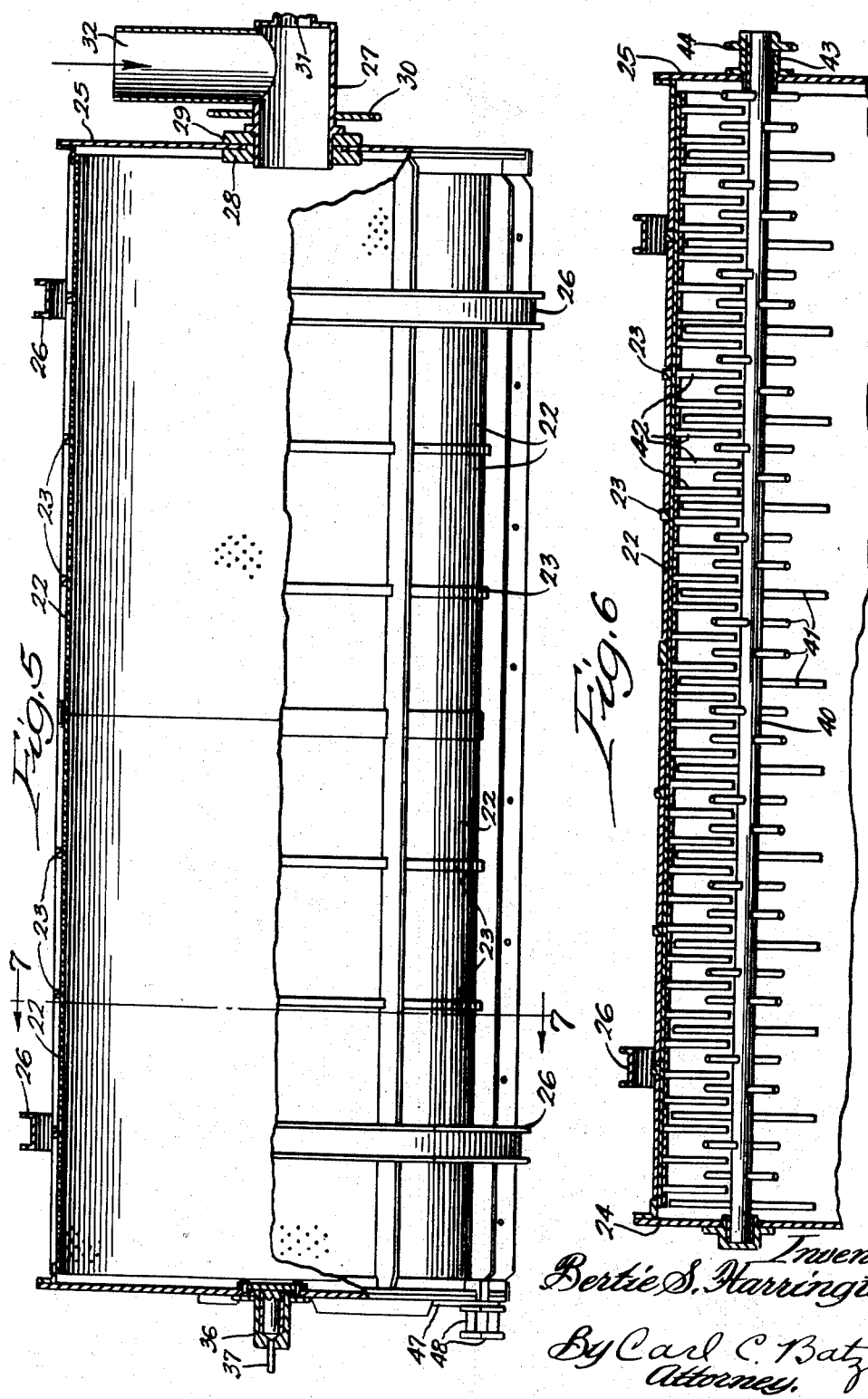
Inventor:
Bertie S. Harrington,
By Carl C. Batz
Attorney.

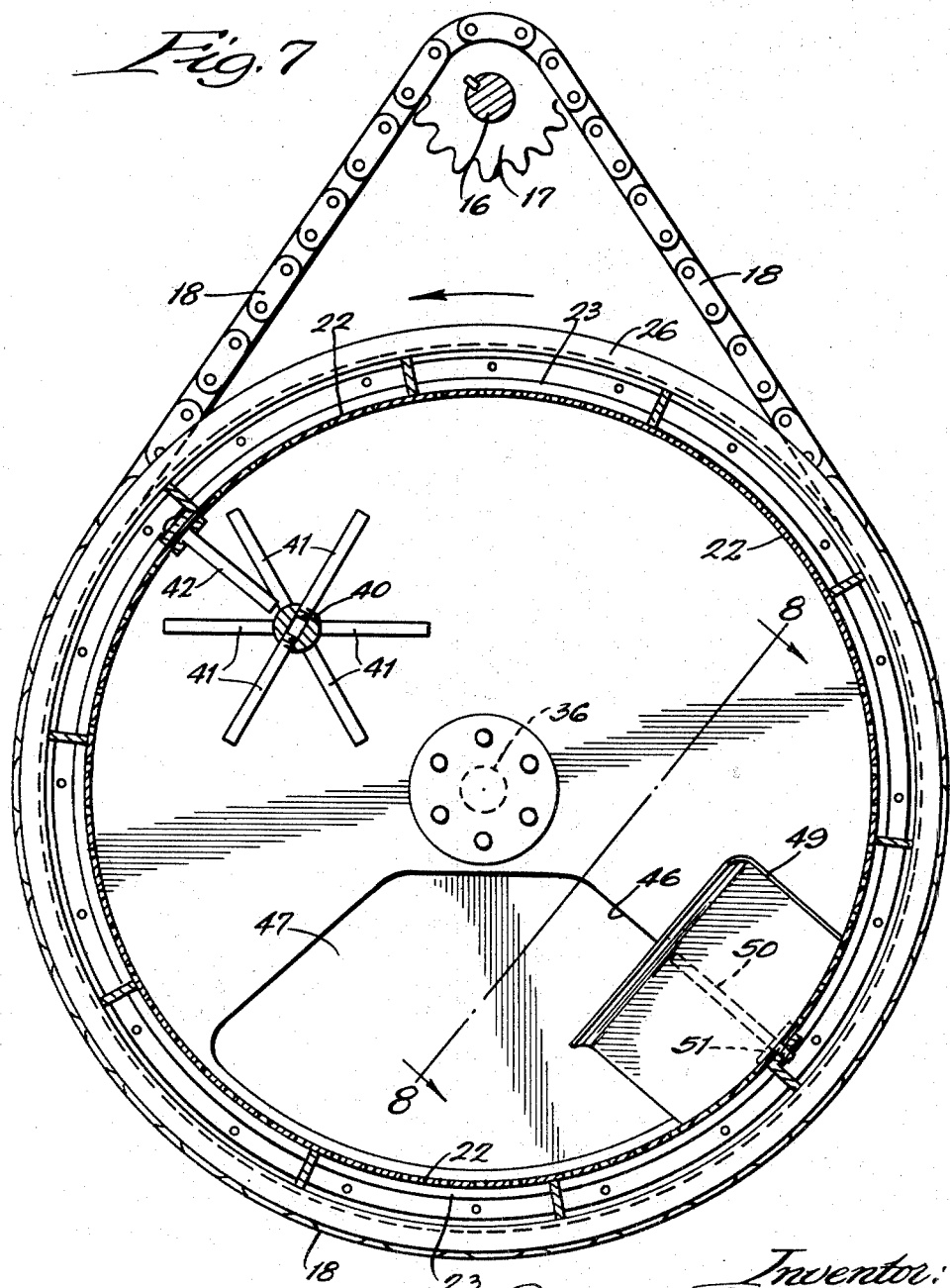

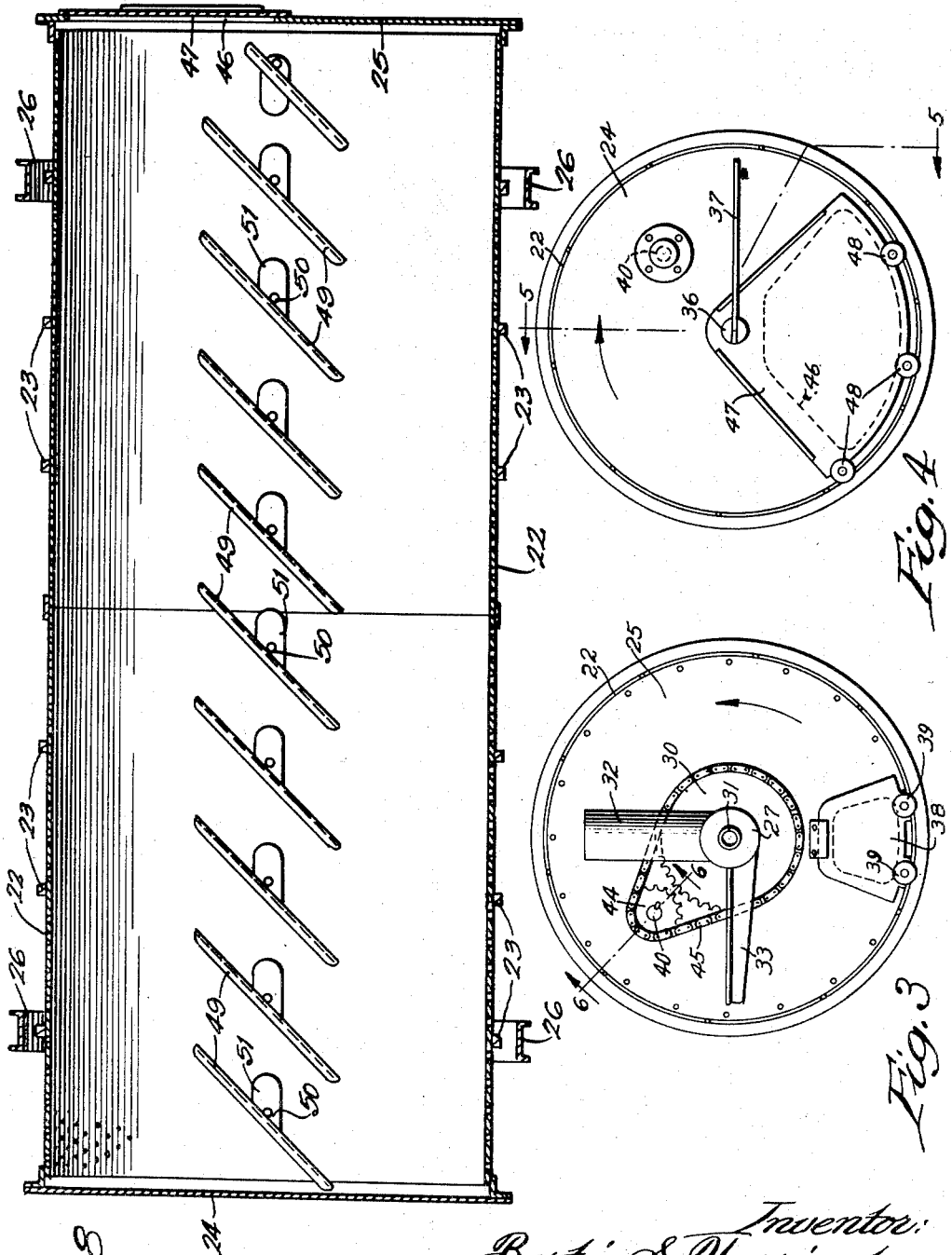

Patented Jan. 2, 1951

2,536,054

UNITED STATES PATENT OFFICE 2,536,054

APPARATUS FOR MANUFACTURING CHEESE AND THE LIKE

Bertie S. Harrington, Chicago, Ill., assignor to Armour and Company, Chicago, Ill., a corporation of Illinois Application December 10, 1947, Serial No. 790,773

7 Claims. (Cl. 31—48)

This invention relates to apparatus for cheese manufacture and the like. The apparatus, and particularly portions thereof, is also adaptable for many other uses.

In the manufacture of cheese, it is customary to treat the milk in vats to form a curd, to withdraw the whey to a substantial extent, and then to treat the curd as a mass in several steps involving hand operations. Such hand operations require the cutting up of the curd and the storing of it in a large mass, the treating of the surface of a body, and, finally, the trimming of the cheese and the cutting of the same. Such hand operations require considerable time, are expensive and involve sanitation hazards.

An object of the present invention is to provide apparatus for mechanically carrying through most of the operations formerly done by hand, while producing a much better product and discharging the same mechanically into receptacles. A still further object is to provide apparatus of simple and sturdy construction, which effectively removes the bulk of the whey from the curd in an extremely brief interval, while treating the curd to produce the desired cheese body and eliminating whey from the material to a desired greater degree. Yet, another object is to provide apparatus in which curd and whey are directed to a perforated cylinder suspended in a frame, means being provided for rotating the cylinder intermittently or slowly, while simultaneously breaking up the curd body within the cylinder into relatively small fragments. Yet, another object is to provide such an apparatus equipped with means for driving a breaker device to keep the curd in disintegrated form, while at the same time providing means for introducing a gaseous medium into contact with the curd. A still further object is to provide apparatus in which a cylindrical tank is suspended and with means for centering the tank with respect to the frame during the rotation thereof. A still further object is to provide a perforated cylindrical tank structure, which is rotated within a frame and which is equipped with discharge mechanism for directing cheese from the cylinder into receptacles. Other specific objects and advantages will appear as the specification proceeds.

The invention is illustrated, in a preferred embodiment, by the accompanying drawings, in which—

Figure 1 is a perspective view of apparatus embodying my invention; Fig. 2, a view similar to Fig. 1, but showing the opposite end of the apparatus; Fig. 3, an end broken view in elevation of the inlet end of the cylindrical tank; Fig. 4, a view similar to Fig. 3, but showing the outlet end of the tank; Fig. 5, a broken longitudinal sectional view of the cylindrical tank structure; Fig. 6, a detail sectional view, the section being taken as indicated at line 6 of Fig. 3; Fig. 7, a transverse sectional view, the section being taken as indicated at line 7 of Fig. 5; and Fig. 8, a detail sectional view, the section being taken as indicated at line 8 of Fig. 7.

In the illustration given, 10 designates a frame. The frame 10 is provided with cross pieces 11 upon which rests a trough 12 equipped with an outlet 13. It will be understood that the outlet 13 communicates with suitable pipes or channels for the withdrawal of whey or other liquid. Extending upwardly from the trough 12 are side walls 14 which direct whey, or other liquid, into the trough 12.

The frame 10 is provided at its top with cross pieces 15 on which is mounted, in suitable bearings, a shaft 16. The shaft 16 is equipped with a pair of sprocket wheels 17 on which are mounted chains 18. The shaft 16 is rotated by a motor 19, the sprocket-equipped drive shaft of which is connected by a chain to a large sprocket 20 on the shaft 16.

Suspended by the chains 18 is a large cylindrical tank 21. In the illustration given, the tank 21 comprises a perforated cylinder 22 braced with angle iron rings 23 and equipped, at its ends, with imperforate end plates 24 and 25. The end plates are fixed to the perforated cylinder 22 and rotate therewith. The cylinder 22 is provided with a pair of recessed rings 26 which receive the chains 18.

The end plate 25 is on the inlet side of the cylinder and is provided centrally with an aperture receiving an inlet pipe 27, as shown more clearly in Fig. 5. The plates 28 and 29 provide a seal about the fixed pipe 27 and the end plate 25. Pipe 27 is equipped with a sprocket 30, which will be referred to hereinafter. At its end, the pipe 27 is reduced to communicate with an inlet pipe 31 leading to a pump by which whey and curd may be pumped into the cylindrical tank. Communicating with the upper end of the tank is a pipe 32 leading to a source of gaseous medium, which is to be introduced into the tank. If desired, air may be forced through pipe 32 or, if it is desired to keep the curd out of contact with air, an inert or other gaseous medium may be introduced through the pipe 32 into the interior of the tank.

In order to center the pipe 27 during the rotation thereof, I weld to the pipe 27 a brace arm 33, which is releasably connected, at its end, to a bracket 34 by means of a pin 35 extending through an aperture in the arm 33.

If desired, the opposite end plate 24 may be apertured to receive a centering shaft 36 from which a stabilizing bar 37 leads to a bracket 38, as shown more clearly in Fig. 1.

The plate 25 may be equipped with an auxiliary opening for cleaning or other uses and which is closed by a hinged cover 38, as shown more clearly in Fig. 2. Adjustable screw members 39 may be provided for releasably confining the cover 38 in closed position.

It is important that the curd be kept in comminuted form during the treating operation, and for this purpose, I provide a shaft 40 having its ends journaled in the end plates 24 and 25, as shown more clearly in Fig. 6. The shaft 40 is provided with breaker arms 41 extending through the shaft at different angles. Aligned with the breaker arms and extending on either side thereof are the fixed arms 42, which are secured within the perforated cylinder wall. The arms 42 extend in a row and provide a comb with which the breaker arms 41 cooperate in breaking up the curd masses. The outer end of the shaft 40 is equipped with a head 43 upon which is mounted a sprocket 44. The sprocket 44 is connected by means of a chain 45, with the fixed sprocket 30 mounted upon the stationary pipe 27. Thus, when the cylinder rotates carrying with it the rotatable sprocket 44, the shaft 40 is rotated and the breaker arms 41 pass between the comb arms 42.

The end plate 24 is provided with a sector outlet opening 46, and the opening is closed normally by a sector gate 47 rotatably mounted on the shaft 36. The headed screw members 48 serve to releasably confine the sector gate 47 in closed position. When it is desired to open the gate, the closure members 48 may be loosened and the sector gate 47 swung to the left, as shown in Fig. 4, to clear the opening 46. A closure member 48 may then be tightened to retain the closure 47 in the open position.

For advancing the finished cheese toward the outlet opening 46, I provide, on the inner side of the cylinder 22, a number of aligned baffles 49, as shown more clearly in Figs. 7 and 8. The baffles 49 are supported on posts 50 threadedly secured in the cylinder 22 and the rings 23 therebelow and the baffles are turned obliquely, as indicated more clearly in Fig. 8. A plate 51, which is preferably curved to fit the contour of the cylinder 22, is welded to each baffle 49 and is perforated to receive the attachment post 50. The vanes or baffles 49 aid in stirring the curd particles and in breaking up the same, and are particularly useful in the discharge of the cheese by directing the cheese, during a relatively rapid rotation of the cylinder 22, toward the outlet opening 46.

Operation

In the operation of the apparatus, after the milk has been treated to precipitate the curd, the curd and whey together are pumped through pipe 31 into the inlet pipe 27, and thence into the interior of the cylinder 22. The cylinder 22 is set into motion and rotates slowly. Extremely quick separation of the whey results, and the whey is drawn off through the trough 12 at any desired point of collection. The desired gaseous medium for the treatment of the curd is introduced through the pipe 32 and inlet pipe 27. rotation of the pipe 27 is prevented by the brace arm 33, which engages a bracket 34 on a fixed portion of the frame 10. At the same time, the brace arm 33 and the brace rod 37 center the plates 24 and 25 and the cylinder 22 so that the rotation occurs evenly along a central longitudinal axis.

The operation of the cylinder may be varied as desired. It may be operated for a few revolutions and then stopped or, if desired, it may be operated at one continuous low speed. Intermittent operation has been found highly effective in the treatment of the curd.

The treatment of curd within a rotating body tends to produce masses or balls, which become large in size and which prevent the forming of the desired cheese body with good cheese characteristics. I have found that good results can be obtained by providing a driven member within the apparatus for continuously breaking up the curd so as to maintain it in small particles. As the cylinder and its heads 24 and 25 rotate, the sprocket 44 is carried around the central fixed sprocket 30, and this movement causes a rotation of the sprocket 44 by reason of the connecting chain 45. The shaft 40, fixed to sprocket 44, rotates and with it the breaker arms 41. The curd caught between the comb arms 42 and engaged by the breaker arms 41, is disintegrated and maintained in small discrete particles. The small particles of curd are freed to a substantial extent of the whey therein by reason of the small size of the particles and by the rotation of the cylinder 22.

I find that, as the cylinder rotates, the curd clinging to the sides thereof tends to break away along the top of the cylinder, and the suction effect of the curd thus breaking away maintains the perforations of the cylinder 22 clean and open so that effective drainage is constantly maintained. I also find that the broken-up mass of curd lining the walls of the cylinder 22 form a mat or filter through which the whey passes, thus insuring the removal of all fat and other desired materials from the whey which is withdrawn through the perforations.

When the cheese has acquired the desired flavor characteristics and body, it may be removed automatically from the cylinder by opening the outlet opening 46, the closure 47 being swung to one side and latched in open position, as already described. Rotation of the cylinder may be relatively rapid, and this causes the cheese to be advanced by the inclined baffles 49 so as to bring the cheese against the discharge opening 46. The cheese discharged from the opening may be received by packaging receptacles, etc. as a finished product.

While in the illustrated embodiment of the invention only one breaker member comprising shaft 40, arms 41, etc. has been provided, I have found that it is sometimes advantageous to provide two or more of such members, and this may be easily accomplished by mounting a second shaft radially spaced from shaft 40 together with a second comb and associated fittings, this second shaft being driven by a second pair of chain and gears corresponding with chain 45 and gears 30 and 44.

While the apparatus has been described in connection with the manufacture of cheese, it will be understood that the apparatus is adapted to a variety of other uses. For example, a suspended cylinder equipped with centering arms may be employed in a variety of treating machines.

While in the foregoing specification, I have described the apparatus in great detail for the purpose of illustrating one embodiment of the invention, it will be understood that such details of structure may be varied widely by those skilled in the art without departing from the spirit of my invention.

I claim:

1. An apparatus of the class described, a pair of sprocket wheels, endless chains depending therefrom, a perforated cylinder provided with end plates, one of said end plates being provided with an axial aperture, said cylinder passing through and being supported by said chains, means for moving the chains operative to rotate the cylinder, a fixed tube inserted in said aperture, a sprocket wheel fixed to said tube, a shaft extending through said cylinder and end plates in off-center relation thereto, a sprocket wheel fixed to the end of said shaft co-planar with the first-mentioned sprocket wheel, and a chain connecting said sprockets operative to rotate the shaft when the cylinder is rotated.

2. In cheese-manufacturing apparatus, a frame, a perforated cylinder rotatably mounted therein and having end plates, means for rotating the cylinder, input means for introducing whey and curd into one end of the cylinder during its rotation, outlet means at the other end of the cylinder, a plurality of radially inward-extending pins spaced axially along the inner surface of the cylinder, a shaft within the cylinder carried by the end plates for rotation in an axis parallel to the axis of the cylinder, a plurality of pins spaced along the shaft and extending outward perpendicularly to the shaft, said pins being positioned on the shaft in interlacing relation with the aforementioned inward-extending pins on the inner surface of the cylinder, and means mechanically coupling the cylinder and shaft for effecting rotation of the shaft as the cylinder is rotated.

3. Apparatus according to claim 2 having trough means mounted on the frame and adapted continuously to catch the whey as it passes through the wall of the perforated cylinder after being extracted from the curd by the co-operative action of the pins on the cylinder wall and the pins carried by the shaft.

4. In cheese-manufacturing apparatus, a frame, a perforated cylinder rotatably mounted therein and having end plates, means for rotating the cylinder, input means for introducing whey and curd into one end of the cylinder during its rotation, outlet means at the other end of the cylinder, a plurality of spaced, angularly disposed vanes mounted on the inner surface of the cylinder, each of said vanes extending less than half the distance to the cylinder axis in the radial direction and subtending substantially less than half the circumferential arc of said cylinder, the angular disposition of said vanes being operative gradually to urge the curd toward the outlet means as the cylinder is rotated, a plurality of radially inward-extending pins spaced axially along the inner surface of the cylinder opposite said vanes, a shaft within the cylinder carried by the end plates for rotation in an axis parallel to the axis of the cylinder, a plurality of pins spaced along the shaft and extending outward perpendicularly to the shaft, said pins being positioned on the shaft in interlacing relation with the aforementioned inward-extending pins on the inner surface of the cylinder, and means mechanically coupling the cylinder and shaft for effecting rotation of the shaft as the cylinder is rotated.

5. Apparatus according to claim 4 having trough means mounted on the frame and adapted continuously to catch the whey as it passes through the wall of the perforated cylinder after being extracted from the curd during the passage of the curd from the input end of the cylinder to the outlet end thereof.

6. In cheese-manufacturing apparatus, a frame, a perforated cylinder rotatably mounted therein and having end plates, means for rotating the cylinder, input means for introducing whey and curd into one end of the cylinder during its rotation, outlet means at the other end of the cylinder, and a plurality of spaced, angularly disposed vanes mounted on the inner surface of the cylinder, each of said vanes extending less than half the distance to the cylinder axis in the radial direction and subtending substantially less than half the circumferential arc of said cylinder, the angular disposition of said vanes being operative gradually to urge the curd toward the outlet means as the cylinder is rotated.

7. Apparatus according to claim 1 having trough means mounted on the frame and adapted continuously to catch the whey as it passes through the wall of the perforated cylinder during the rotation of the cylinder.

BERTIE S. HARRINGTON.

REFERENCES CITED

The following references are of record in the file of this patent:

UNITED STATES PATENTS

| Number | Name | Date |
|---|---|---|
| 66,122 | Blecka | June 25, 1867 |
| 808,481 | Schaffer | Dec. 26, 1905 |
| 1,390,343 | Disbrow | Sept. 13, 1921 |
| 1,475,398 | Kielsmeier | Nov. 27, 1923 |
| 2,089,215 | Lomax | Aug. 10, 1937 |

FOREIGN PATENTS

| Number | Country | Date |
|---|---|---|
| 220,475 | Germany | Mar. 30, 1910 |